US007997303B2

(12) United States Patent
Hoffhaus et al.

(10) Patent No.: US 7,997,303 B2

(45) Date of Patent: Aug. 16, 2011

(54) PIPE SEGMENT FOR A TRANSFER LINE FOR TRANSPORTING HOT PARTICULATE MATERIAL

(75) Inventors: Karsten Hoffhaus, Emstek (DE); Gunther Kazmeier, Nidderau (DE); Marco Aurelio Flores-Verdugo, Monterrey (MX)

(73) Assignee: Outotec Oyj, Espoo (FI)

(*) Notice: Subject to any disclaimer, the term of this patent is extended or adjusted under 35 U.S.C. 154(b) by 1062 days.

(21) Appl. No.: 10/576,407

(22) PCT Filed: Oct. 16, 2004

(86) PCT No.: PCT/EP2004/011699

§ 371 (c)(1), (2), (4) Date: Jun. 19, 2007

(87) PCT Pub. No.: WO2005/040706

PCT Pub. Date: May 6, 2005

(65) Prior Publication Data

US 2007/0272318 A1 Nov. 29, 2007

(30) Foreign Application Priority Data

Oct. 21, 2003 (AU) ................................ 2003905978

(51) Int. Cl.
*F16L 11/00* (2006.01)

(52) U.S. Cl. ........ 138/114; 138/112; 138/113; 138/149; 138/148; 138/108; 285/123.16; 285/419

(58) Field of Classification Search .................. 138/112, 138/113, 149; 285/123.16, 123.17, 419, 285/133.11

See application file for complete search history.

(56) References Cited

U.S. PATENT DOCUMENTS 3,371,186 A 2/1968 Traviley (Continued)

FOREIGN PATENT DOCUMENTS

AU 20040228981 B2 9/2010

(Continued)

OTHER PUBLICATIONS

PCT International Search Report for PCT/EP2004/011699 mailed Feb. 4, 2005.

*Primary Examiner* — Patrick F Brinson

(74) *Attorney, Agent, or Firm* — Leydig, Voit & Mayer, Ltd.

(57) ABSTRACT

The present invention relates to a pipe segment including an outer and an inner pipe section, with the inner pipe section being positioned within the outer pipe section, and a support means supporting the inner pipe section in relation to the outer pipe section so that the inner pipe section can expand axially relative to the outer pipe section in response to temperature changes in the material being transported in the pipe segment. Furthermore, the present invention refers to a transfer line for transporting hot particulate material, such as iron ore fines, in a carrier gas, including a plurality of these pipe segments and to a process for transporting hot particulate material in a carrier gas in a direct smelting plant for producing molten metal from a metalliferous feed material, in particular between a pretreatment unit and solid delivery means in the form of lances for injecting the material into a direct smelting vessel.

25 Claims, 8 Drawing Sheets

U.S. PATENT DOCUMENTS

| | | | | | |
|---|---|---|---|---|---|
| 3,563,572 | A | * | 2/1971 | French | 285/47 |
| 3,573,337 | A | | 4/1971 | Grimm et al. | 13/33 |
| 3,865,145 | A | * | 2/1975 | McKay et al. | 138/113 |
| 4,084,842 | A | * | 4/1978 | Stonitsch et al. | 285/47 |
| 4,219,224 | A | * | 8/1980 | Hanley | 285/47 |
| 4,221,405 | A | * | 9/1980 | Stonitsch et al. | 285/53 |
| 4,363,504 | A | * | 12/1982 | De Feo et al. | 285/47 |
| 5,901,753 | A | * | 5/1999 | Ziu | 138/113 |
| 6,086,114 | A | * | 7/2000 | Ziu | 285/123.16 |
| 6,231,087 | B1 | * | 5/2001 | Ziu | 285/123.16 |

FOREIGN PATENT DOCUMENTS

| | | | |
|---|---|---|---|
| CN | 2437944 | Y | 7/2001 |
| CN | 2504469 | Y | 8/2002 |
| CN | 2572193 | Y | 9/2003 |
| WO | WO 02/02827 | | 1/2002 |

* cited by examiner

PIPE SEGMENT FOR A TRANSFER LINE FOR TRANSPORTING HOT PARTICULATE MATERIAL

This application claims the benefit of International Application No. PCT/EP2004/011699 filed on Oct. 16, 2004 under 35 U.S.C. §371, entitled, "A Pipe Segment For A Transfer Line For Transporting Hot Particulate Material" which claims the benefit of Australian Patent Application No. 2003905978 filed on Oct. 21, 2003.

TECHNICAL FIELD

The present invention relates to a pipe segment for transporting a hot particulate material, such as hot iron ore fines, in a carrier gas in a transfer line, a transfer line for transporting hot particulate material including a plurality of such pipe segments as well as to a process for transporting hot particulate material in a carrier gas in a direct smelting plant for producing molten metal from a metalliferous feed material, in particular between a pretreatment unit and solid delivery means in the form of lances for injecting the material into a direct smelting vessel.

An Australian provisional application in the name of the applicant lodged on the same day as the subject application describes a direct smelting plant for producing molten metal, such as molten iron, from metalliferous feed material, such as iron ore fines, that includes:

(a) a pretreatment unit for pretreating metalliferous feed material and producing pretreated feed material having a temperature of at least 200° C.;

(b) a direct smelting vessel for smelting pretreated metalliferous feed material to molten metal, the vessel being adapted to contain a molten bath of metal and slag, the vessel including a solids delivery means for receiving and thereafter supplying pretreated metalliferous feed material at a pressure above atmospheric pressure and at a temperature of at least 200° C. into the vessel;

(c) a hot feed material transfer apparatus for transferring pretreated metalliferous feed material from the pretreatment unit to the solids delivery means of the direct smelting vessel, the transfer apparatus comprising:

(i) a hot feed material storage means for storing pretreated metalliferous feed material at at least 200° C. and at a pressure above atmospheric pressure;

(ii) a hot feed material transfer line for transferring pretreated metalliferous feed material at at least 200° C. under pressure to the solids delivery means of the direct smelting vessel;

(iii) a pressurising means for supplying gas at a pressure above atmospheric pressure to the hot feed material storage means for pressurising the storage means and to the hot feed material transfer line for acting as a carrier gas for transporting pretreated metalliferous feed material along the line to the solids delivery means.

A commercial scale direct smelting plant of the type described in the Australian provisional application that is currently being constructed will include a pretreatment unit that will preheat iron ore fines of 6-8 mm top size to a temperature of the order of 680° C. The hot ore will be transported hot, i.e at temperatures of the order of 680° C., by the hot feed material transfer apparatus to the solids delivery means of the direct smelting vessel and thereafter be injected hot, suspended within a carrier gas having a velocity in the range of 70-120 m/s into the vessel. The current plant design includes four solids delivery means in the form of solids injection lances and two transfer lines for supplying hot ore fines to the lances, with one transfer line supplying hot ore fines to a pair of lances. The plant is designed to process a substantial amount of iron ore fines. Specifically, each transfer line is currently designed to transport 110-120 tph of hot ore fines to each pair of lances, with the hot ore fines bring transported along the lines by nitrogen gas supplied at 20° C. at a rate of 3100 $Nm^3$/hr.

The above-described direct smelting plant presents significant materials handling issues for the hot feed material transfer apparatus.

Specifically, iron ore fines are abrasive and, therefore, wear of transfer lines is a significant design issue.

In addition, whilst the direct smelting plant is designed to operate for long campaigns, typically more than 12 months, the temperature of the transfer lines will not remain constant during a campaign and, accordingly, accommodating thermal expansion while maintaining line seal integrity is another significant design issue for the transfer lines.

In addition, the pressure within the transfer lines will not remain constant during a campaign and may vary quite considerably, particularly in situations where sudden deliberate increases and decreases in internal pressures are used to clear blockages in transfer lines. Accordingly, accommodating internal pressure variations within transfer lines while maintaining line seal integrity is another significant design issue for the transfer lines.

The present invention focuses on the transfer lines, and more particularly on pipe segments for constructing the transfer lines, for the hot feed material transfer apparatus of the above-described direct smelting plant.

The present invention is not confined to this application and extends generally to hot particulate material transfer lines and pipe segments for constructing the transfer lines.

DISCLOSURE OF THE INVENTION

According to the present invention there is provided a pipe segment for transporting a hot particulate material, such as hot iron ore fines, in a carrier gas in a transfer line, which pipe segment includes:

(a) an outer pipe section;

(b) an inner pipe section defining a passageway for a hot particulate material and a carrier gas, the inner pipe section being positioned within the outer pipe section, and the inner pipe section being formed from or having an inner lining of an abrasion resistant material; and (c) a support means supporting the inner pipe section in relation to the outer pipe section so that the inner pipe section can expand axially relative to the outer pipe section in response to temperature changes in the material being transported in the pipe segment, the support means including a first support means located at one end of the pipe segment, the first support means including a support member that can receive an end of an inner pipe section of an adjacent pipe segment when the adjacent pipe segment is positioned in use in end to end relationship with the said pipe segment and can allow axial expansion of that inner pipe section relative to the outer pipe section of the said adjacent pipe segment in response to temperature changes in the material being transported in the said adjacent pipe segment.

Preferably the support member encloses and extends axially from one end of the inner pipe section of the said pipe segment and can receive and enclose the end of the inner pipe section of the adjacent pipe segment when the said adjacent pipe segment is positioned in use in end to end relationship with the said pipe segment and can allow axial expansion of at least that inner pipe section while the ends remain enclosed within the support member.

The above arrangement makes it possible for the inner pipe sections of the said pipe segment and the said adjacent pipe segment to be positioned in end to end relationship with gaps between the ends of the inner pipe sections that can allow axial expansion of one or both of the inner pipe sections relative to the outer pipe section or sections in response to thermal expansion or contraction of the inner pipe section or sections and while maintaining an appropriate seal between the ends of the inner pipe sections.

Preferably the support member forms a seal with the ends of the inner pipe sections of the said pipe segment and the said adjacent pipe segment.

Preferably the support member includes an inwardly facing cylindrical surface for contacting the outer surfaces of the ends of the inner pipe sections of the said pipe segment and the said adjacent pipe segment.

Preferably the support member is in the form of a sleeve having the inwardly facing cylindrical surface.

In one embodiment the support member is directly connected only to the outer pipe section of the said pipe segment, whereby the inner pipe section can move axially relative to the support member and the outer pipe section in response to thermal expansion or contraction of the inner pipe section.

Preferably the first support means also supports the inner pipe section in relation to the outer pipe section so that the inner pipe section can expand radially relative to the outer pipe section.

Preferably the first support means defines a barrier to movement of gas axially along the space between the inner and outer pipe sections of the pipe segments. In the event that carrier gas escapes from the inner pipe sections of a transfer line into the space, gas flow axially along the space can result in the outer pipe sections of the pipe segments buckling and causing hot spots on the surface of the outer pipe sections. The hot spots are a significant safety issue and can have a substantial impact on the viability of a transfer line, and replacement of the damaged pipe segments is necessary. By providing each pipe segment with the barrier makes it possible to confine gas flow within each pipe segment to that pipe segment only and thereby minimises the impact of the escape of carrier gas into the space between the inner and outer pipe sections of the pipe segments.

Preferably the first support means includes a frusto-conical barrier member having a larger diameter end that is welded or otherwise connected to the outer pipe section of the said pipe segment and a smaller diameter end that is welded or otherwise connected to the support member.

Preferably the frusto-conical barrier member is arranged so that the larger diameter end is located at the end of the outer pipe section and the smaller diameter end is located inwardly of the end of the inner pipe segment.

In another embodiment the support member is directly connected to both the outer pipe section and the inner pipe section, whereby the end of the inner pipe section (but not the remainder of the inner pipe section) is constrained from axial expansion relative to the outer pipe section at that end of the pipe segment.

With this arrangement, axial expansion in response to thermal expansion or contraction of the inner pipe section is limited to the other end of the pipe segment.

Preferably the support means includes a second support means positioned at a location along the length of the pipe segment between the ends of the pipe segment and it supports the inner pipe section in relation to the outer pipe section for axial expansion relative to the outer pipe section.

Preferably the second support means also supports the inner pipe section in relation to the outer pipe section so that the inner pipe section can expand radially relative to the outer pipe section.

In one embodiment the second support means is welded or otherwise connected to the outer pipe section and the inner pipe section.

In another embodiment the second support means is welded or otherwise connected to the outer pipe section only, whereby the inner pipe section can move axially relative to the outer pipe section and the second support means.

In another embodiment the second support means is welded or otherwise connected to the inner pipe section only whereby the inner pipe section and the second support means can move axially relative to the outer pipe section.

Preferably the second support means functions as a spring that provides a resistance to radial expansion of the inner pipe section relative to the outer pipe section.

More preferably the second support means is in the form of a plurality of rods, each of which is bent so as to function as a spring, that are positioned at spaced intervals around the circumference of the inner and outer pipe sections at a location along the length of the pipe segment.

Preferably the inner pipe section (4) is made of an wear-resistant and/or abrasion resistant material, e.g. cast iron, and does not comprise an inner and/or outer lining.

More particularly the abrasion resistant material is a white cast iron.

Preferably the outer pipe section is formed from a steel.

Preferably the pipe segment further includes thermal insulation in the space between the inner and outer pipe sections.

Typically the particulate material is iron ore fines, e.g. iron ore fines with a reduction grade between 0 and 100%, preferably a reduction grade between 8 and 95%.

Typically the particulate material is at a temperature between 200 and 850° C. and preferably between 300 and 850° C.

According to the present invention there is also provided a transfer line for transporting hot particulate material, such as iron ore fines, in a carrier gas, which transfer line includes a plurality of the above-described pipe segments positioned in end to end relationship with the ends of adjacent outer pipe sections welded or otherwise connected together, and the end of one of each pair of adjacent inner pipe sections extending into and engaging the support member of the other of the pair of adjacent inner pipe sections.

As is indicated above, the transfer line of the present invention is directed particularly, although by no means exclusively, to transporting hot iron ore fines between a pretreatment unit and solid delivery means in the form of lances for injecting the hot ore fines into a direct smelting vessel in a direct smelting plant.

With this arrangement, preferably the iron ore fines are preheated to a temperature of 680° C. in the pretreatment unit, the carrier gas is at least substantially $N_2$ and is supplied to the transfer line at an ambient temperature, and the operating conditions are controlled so that the hot ore fines are transported along the transfer line at a minimum velocity of at least 19 m/s by the carrier gas, and are injected into the direct smelting vessel with the carrier gas having a lance tip velocity in the range of 70-120 m/s.

Generally the top size of the iron ore fines lies within in the range between 6 and 8 mm. Preferably at least 30% of the iron ore fines have a particle size of less than 0.5 mm, while the d_50 diameter lies between 0.8 and 1.0 mm with a wide particle size distribution. Thus, e.g. 95% of the particles provide a particle size of less than 6.3 mm.

The annular space between the outer and inner pipe sections is typically insulated so that the temperature of the outer pipe is less than 100° C.

Preferably the static pressure in both, the inner and outer pipe sections of the transfer line is substantially equal.

BRIEF DESCRIPTION OF THE DRAWINGS

The present invention is described in more detail hereinafter, by way of example, with reference to the accompanying drawings, of which.

DETAILED DESCRIPTION OF THE PREFERRED EMBODIMENT

The following description is in the context of transfer lines for transporting hot iron ore fines between a pretreatment unit and lances for injecting the hot ore fines into a direct smelting vessel in the direct smelting plant described in the above-mentioned Australian provisional application.

The main components of the direct smelting plant are:

- (a) a pretreatment unit (not shown) in the form of a preheater for preheating iron ore fines, typically having a top size of 6-8 mm, typically to a temperature of the order of 680° C.;
- (b) a direct smelting vessel 5 for smelting the preheated iron ore fines to molten iron; and
- (c) a hot iron-containing feed material transfer apparatus 7 (only partially shown in FIG. 1) for storing preheated iron ore fines and transferring the fines under pressure to solids injection lances of the direct smelting vessel.

The direct smelting vessel 5 may be any suitable vessel for carrying out a direct smelting process, such as the HIsmelt process described above.

Australian provisional application 2003901693 in the name of one of the applicants includes a description of the general construction of a HIsmelt vessel and the disclosure in the Australian provisional application is incorporated herein by cross-reference.

The vessel is also fitted with eight solids injection lances extending downwardly and inwardly through the side walls for injecting preheated iron ore fines, solid carbonaceous material, and fluxes entrained in an oxygen-deficient carrier gas into a molten bath in the vessel. The solids injection lances are in 2 groups of 4 lances, with the lances 27 in one group receiving preheated hot iron ore fines and the lances (not shown) in the other group receiving coal and flux (via a carbonaceous material/flux injection system—not shown) during a smelting operation. The lances in the 2 groups are arranged alternately around the circumference of the vessel.

Figure 1:
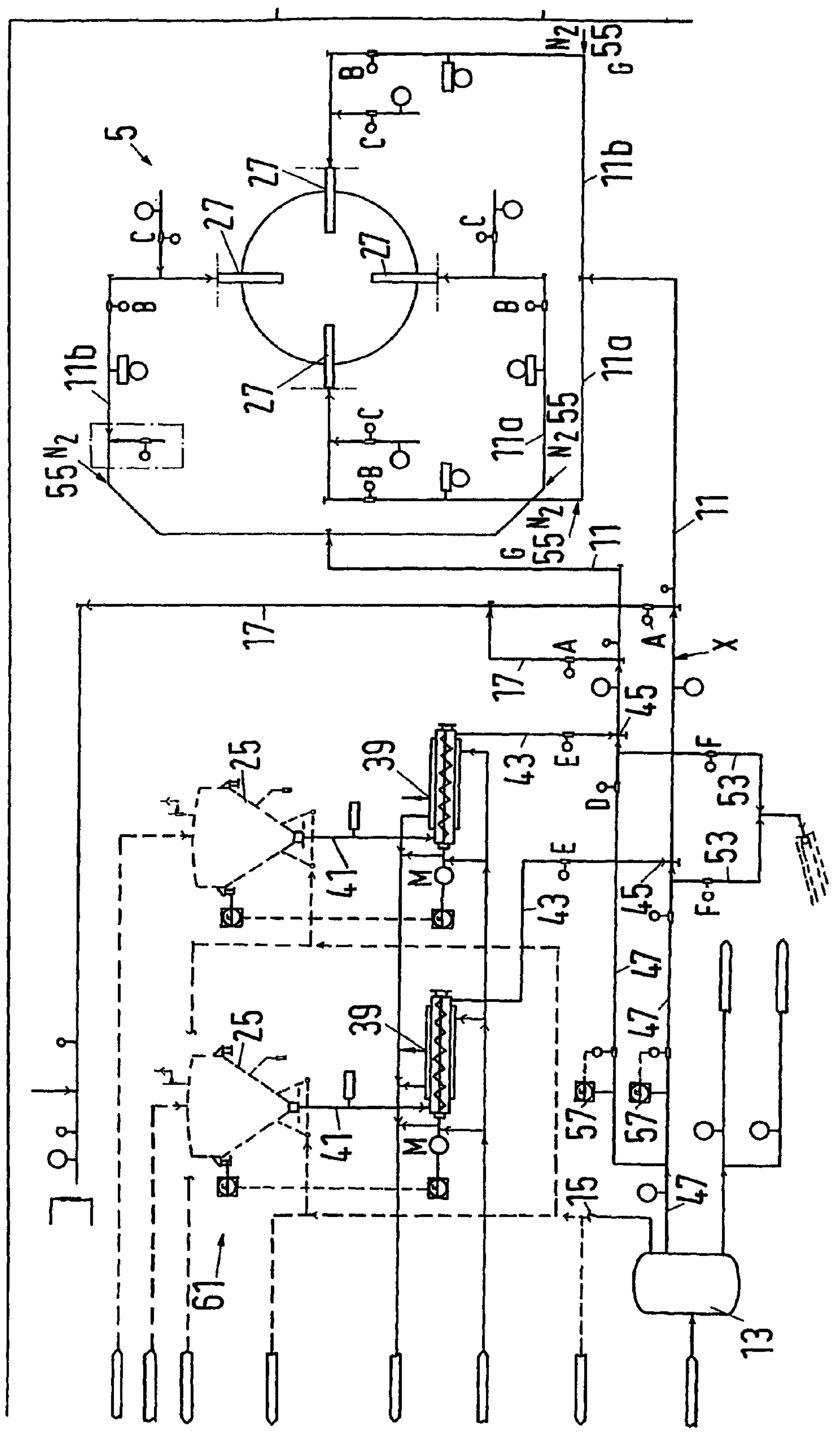
FIG. 1 illustrates in diagrammatic form the lower lock hoppers, screw conveyors, transfer lines, and return lines that form part of a hot iron-containing feed material transfer apparatus of a direct smelting plant.

The hot iron-containing feed material transfer apparatus 7 referred to in item (c) above includes;

- (a) a hot feed material storage means for storing preheated iron ore fines under pressure—illustrated in part in FIG. 1 and generally identified by the numeral 61;
- (b) a series of hot feed material transfer lines 11 for transferring preheated iron ore fines under pressure from the storage means 61 to solids injection lances;
- (c) a source of $N_2$ gas 13 and $N_2$ gas lines 15 for supplying $N_2$ gas to pressurise the storage means 61 and to transport pretreated iron ore fines along the transfer lines 11; and
- (d) a return line 17 for returning preheated iron ore fines to the preheater 3.

The storage means 61 of the hot iron-containing feed material transfer apparatus 7 is divided into 2 groups 9*a* and 9*b*, with one group being connected via a transfer line 11 to one pair of solids injection lances 27 and the other group being connected via another transfer line 11 to the other pair of solids injection lances 27. In use, preheated iron ore fines are supplied via screw conveyors 39 to the inlet ends 45 of the transfer lines 11. $N_2$ gas under pressure and at ambient temperature is also supplied to the inlet ends 45 of the transfer lines 11 from the $N_2$ gas source via lines 47 and picks up and transports the preheated iron ore fines along the transfer lines 11 to the solids injection lances 27.

Each transfer line 11 branches into two sub-branches 11*a*, 11*b* in the region of the direct smelting vessel 5 and the branch lines supply preheated iron ore fines to a diametrically opposed pair of solids injection lances 27.

The return line 17 for each transfer line 11 extends from the return line 11 to the preheater 3. The return lines 17 include appropriately located isolation valves A for controlling flow of preheated iron ore fines into the return lines 17.

The hot iron-containing feed material transfer apparatus 7 also includes a means for controlling the flow of preheated iron ore fines along the transfer lines 11 from the storage means 61 to the solids injection lances 27.

In any given situation, the actual flow rates of $N_2$ gas and preheated iron ore fines supplied to the transfer lines 11 will be a function of a range of variables including the particle size distribution of the iron ore fines, temperatures of the $N_2$ gas and the iron ore fines, and target tip velocities for the solids injection lances 27. In one particular embodiment modeled by the applicants the target pickup velocity is 19 m/s and the target tip velocity of the carrier gas is in the range of 70-120 m/s and each group 9*a*, 9*b* of storage means 61 supplies 123 tph preheated iron ore fines (at 680° C.) to the associated transfer line 11 and the $N_2$ gas 13 supplies 3,100 $Nm^3/hr$ $N_2$ gas at 20° C. to the transfer line 11.

The transfer lines 11 are constructed from a plurality of the pipe segments shown in FIGS. 2 to 6 positioned in end to end relationship.

Figure 2:
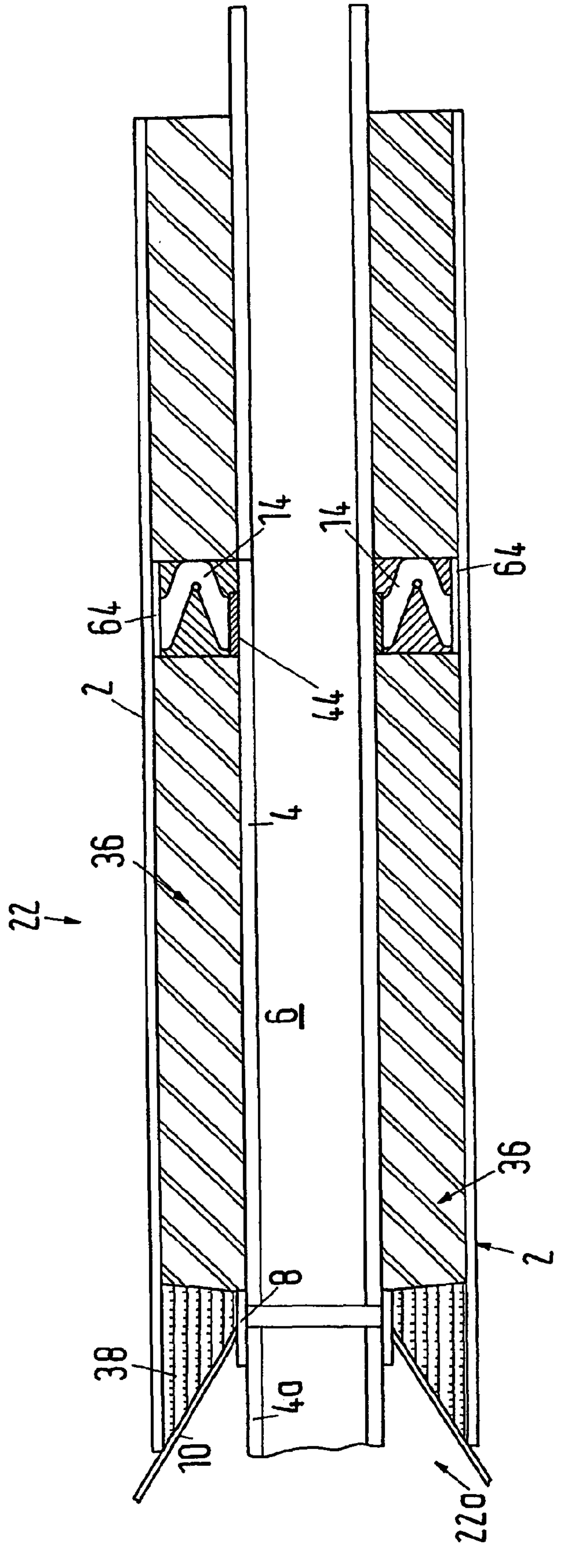
FIG. 2 is a cross-section of one embodiment of a pipe segment in accordance with the present invention.

The end to end relationship of the pipe segments is illustrated in part in FIG. 2. Specifically, the left hand side of the Fig. illustrates an end section of one pipe 22*a* that is only shown to a limited extent in the Fig. and is engaged with the pipe segment 22 that is shown in detail in the Fig.

With reference to FIGS. 2 to 6, the pipe segment 22 includes:

(a) an outer pipe section 2 formed from steel, e.g. formed from SCK carbon steel;

(b) an inner pipe section 4 defining a passageway 6 for hot iron ore fines and $N_2$ carrier gas, the inner pipe section 4 being positioned within the outer pipe section 2 and being formed from an abrasion resistant white cast iron;

(c) a means for supporting the inner pipe section 4 in relation to the outer pipe section; and (d) thermal insulation in the annular space between the outer and inner pipe sections 2, 4.

The inner and outer pipe sections (4, 2) are concentrically with regard to each other.

The support means has the dual function of supporting the inner pipe section 4 in relation to the outer pipe section 2 so that:

(a) the inner pipe section 4 can expand axially in response to temperature changes in the material being transported within the inner pipe section 4; and (b) the inner pipe section 4 can expand radially in response to temperature or pressure changes within the inner pipe section 4.

The support means is positioned at two locations along the length of the pipe segment.

One location of the support means is at the left hand end of the pipe segment as viewed in FIG. 2.

This first support means includes a support member in the form of a sleeve 8 that is formed from the same material as the inner pipe section 4 and is fitted around and welded to the left hand end (as viewed in FIG. 2) of the inner pipe section 4.

The first support means also includes a frusto-conical member 10 that is welded to the sleeve 8 and to the left hand end of the outer pipe section 2 and thereby connects the sleeve 8 to the outer pipe section 2 and supports the sleeve 8 in relation to the inner pipe section 4. The member 10 forms a barrier, i.e. a bulkhead, at that end of the pipe segment, that prevents gas flow along the length of the annular space between the outer and inner pipe sections 2, 4.

The sleeve 8 extends axially from the left hand end of the inner pipe section 4 and, in use, can receive an end of an inner pipe section 4*a* of an adjacent pipe segment 22*a*.

The sleeve 8 is formed so that the inner surface of the sleeve 8 contacts the outer surfaces of the inner end section 4 of the pipe segment 22 and the inner pipe section 4*a* of the adjacent pipe segment and allows sliding movement of the inner pipe section 4*a* within the sleeve 8 in response to thermal expansion/contraction of the inner pipe sections while maintaining a seal with the inner pipe sections 4, 4*a*. This is an effective form of expansion joint.

Figure 6:
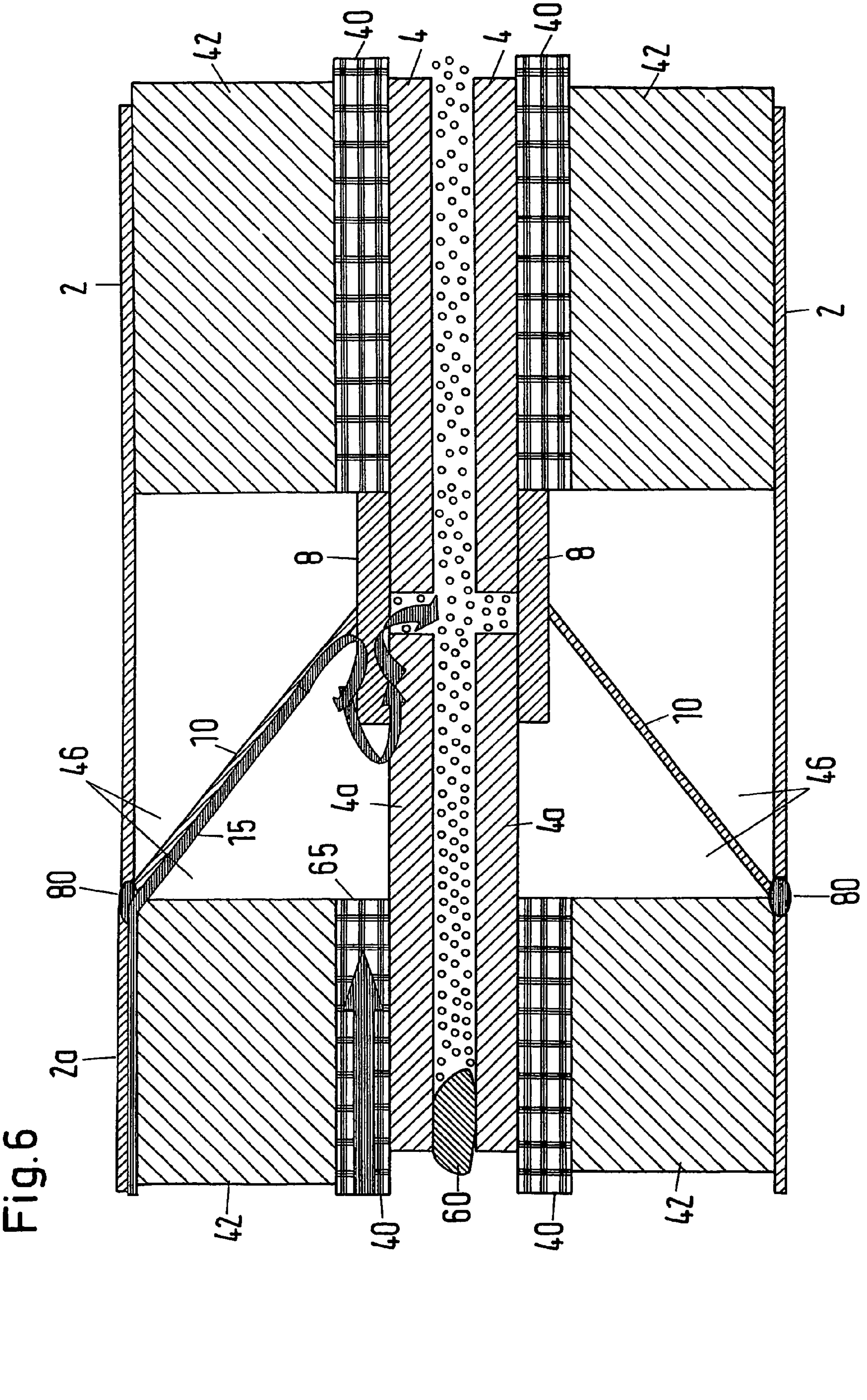

The inner pipe section 4 at the right hand end of the pipe segment 22, as viewed in FIG. 2, extends beyond the outer pipe section 2 at that end and forms an end that can extend in use into a successive pipe positioned in end to end relationship with the pipe segment 22 (see FIG. 6). In this arrangement, inner pipe section 4 at the right hand end of the pipe segment can expand axially to accommodate thermal expansion or contraction of the inner pipe section 4 in the same way as the inner end section 4*a* of the pipe segment at the left hand end of FIG. 2.

The location of the other support means is mid-way along the length of the pipe segment as viewed in FIG. 2.

This second support means includes a sleeve 44 and 3 stainless steel rods 14 that are welded to the sleeve 44 and extend outwardly therefrom. The support means also includes curved skid pads 64 welded to the outer ends of the rods 14.

Figure 3A:
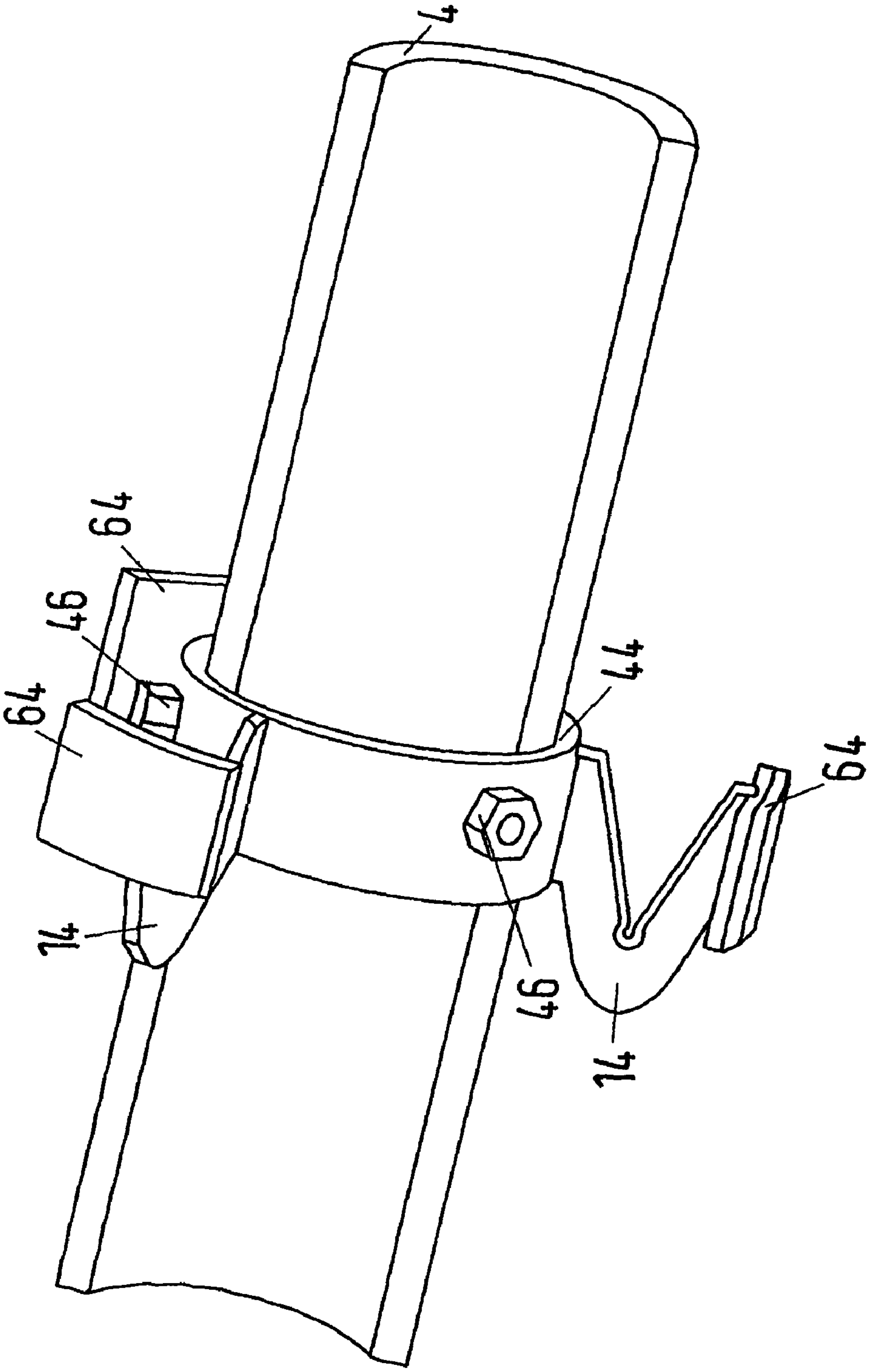
FIG. 3*a* is a partially cut-away cross-section of a central section of the pipe segment shown in FIG. 2 with the outer pipe section removed and illustrating in detail the second support means of the pipe segment.
Figure 3B:
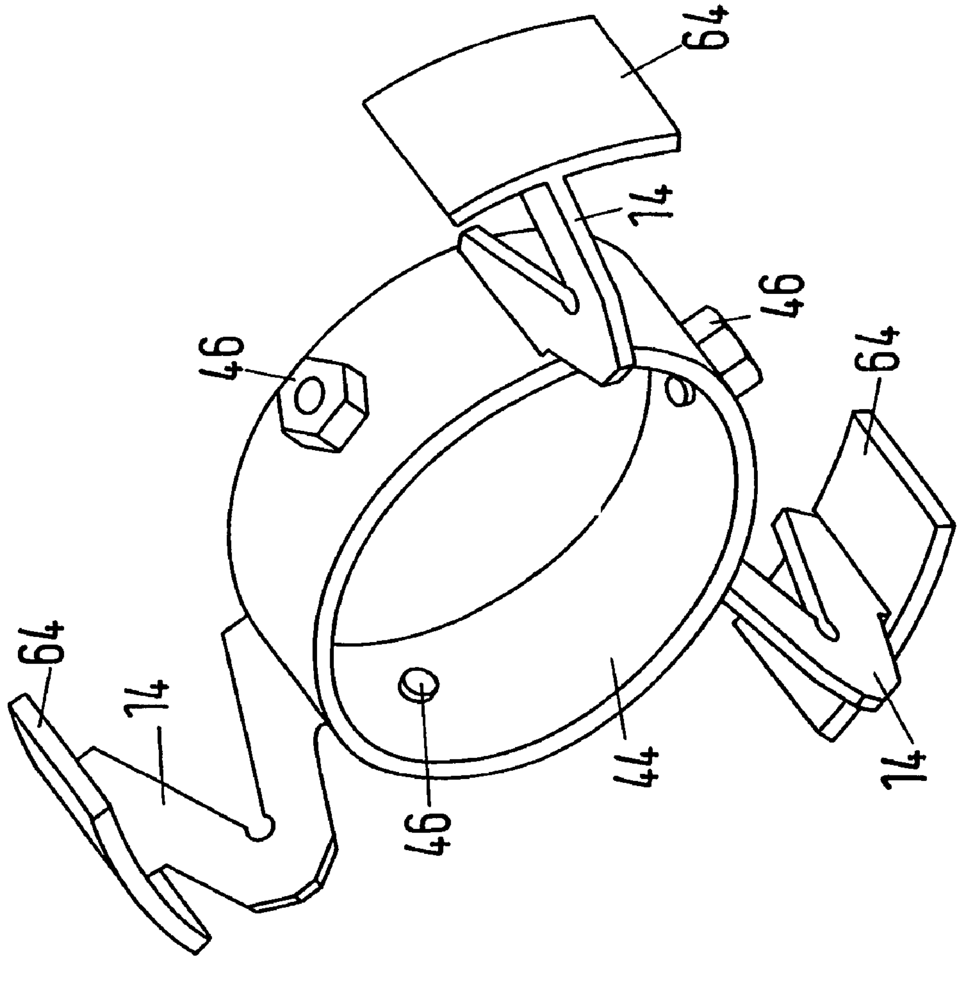
FIG. 3*b* is a pictorial representation of the second support means.

As can best be seen in FIGS. 3*a* and 3*b*, the rods 14 are equi-spaced around the circumference of the sleeve 44.

The sleeve 44 is fixed to the inner pipe section 4 by means of grub screws 46 (FIGS. 3*a* and 3*b*) or the like.

The second support means is formed so that the curved skid pads 64 contact the inner surface of the outer pipe section 2 of the pipe segment. Thus, the inner pipe section 4 and the support means can move axially in relation to the outer pipe section 2.

The second support means locates the inner pipe section 4 in relation to the outer pipe section 2. This is important having regard to the length of the pipe segment and the objective of this embodiment of providing an arrangement in which the inner pipe section 4 can move axially and radially relative to the outer pipe section 2.

With regard to the latter point, the rods 14 of the second support means are bent into a V-shape form and thereby function as springs that can respond to changes in temperature or internal pressure in the inner pipe section 4 of the pipe segment 22 and provide a restoring force that resists outward radial expansion of the inner pipe section 4.

Figure 4:
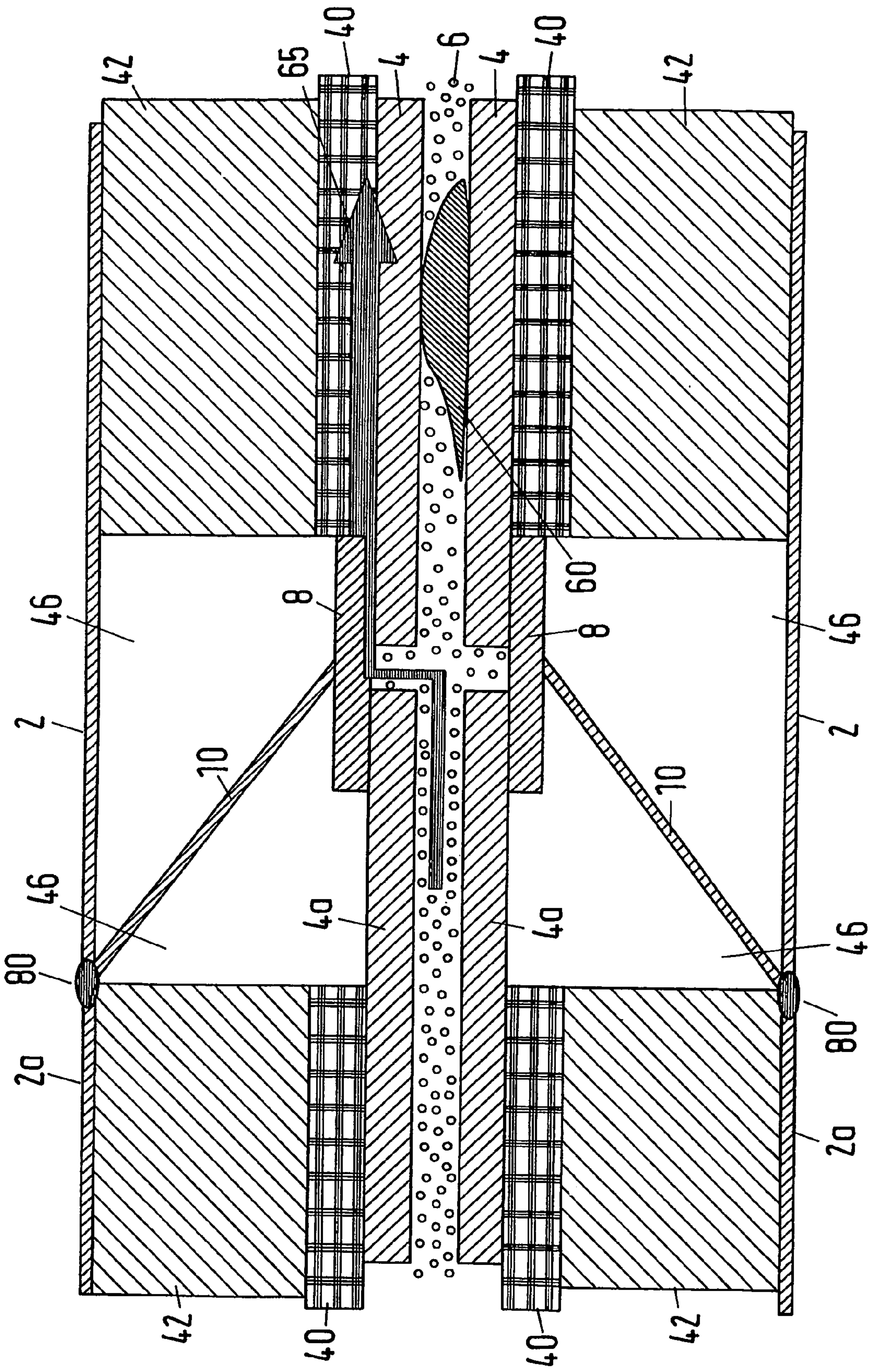
FIGS. 4 to 6 are a sequence of 3 cross-sections illustrating the flow paths of carrier gas that escapes from the passageway defined by the inner pipe sections at one end of a pipe segment into the annular space between the inner and outer pipe sections and how the gas may return to the passageway at the other end of the inner pipe segment.
Figure 5:
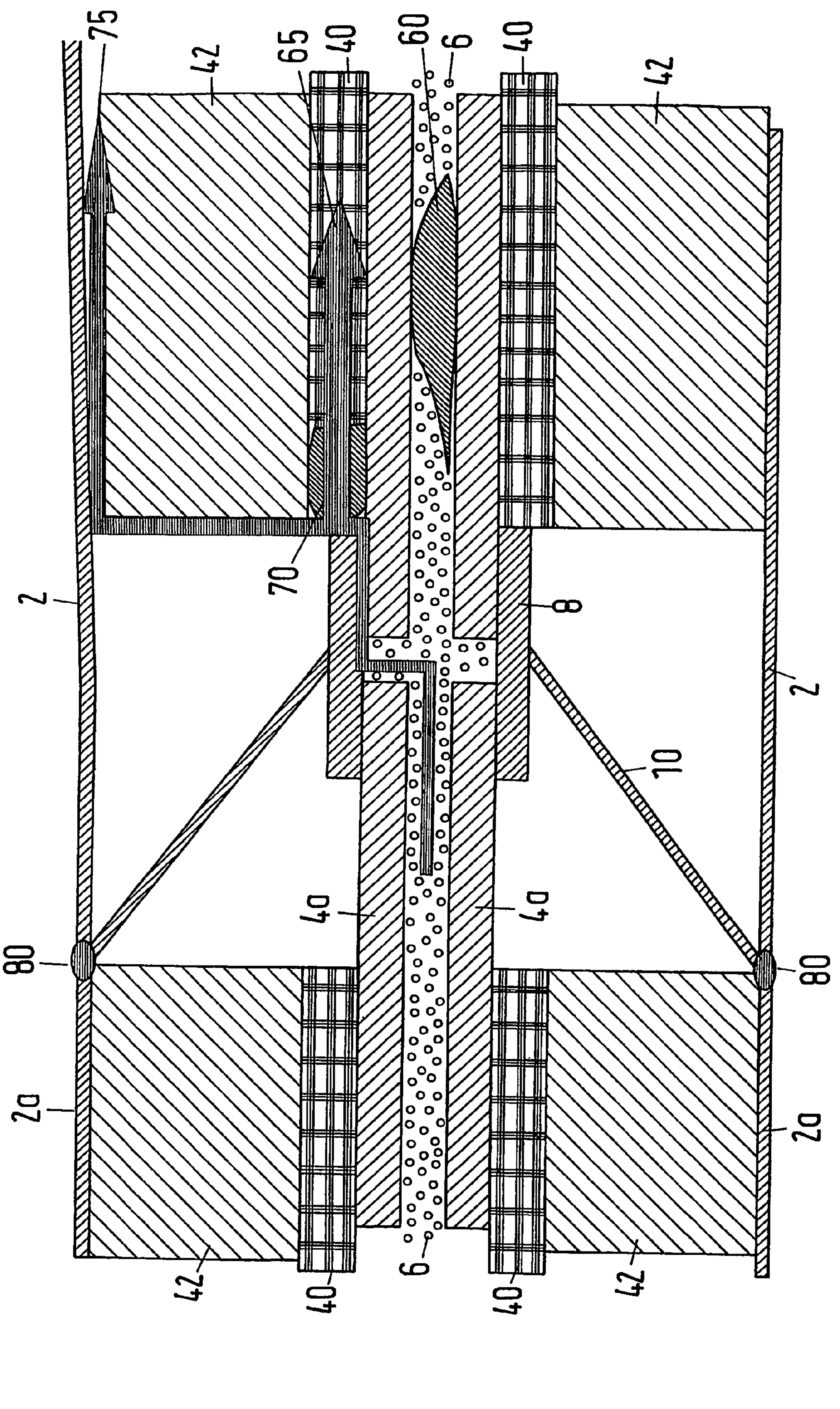

The insulation in the annular space between the inner and outer pipe sections 2,4 may be any suitable insulation. FIG. 2 indicates that the insulation is in the form of fibreboard insulation 36 along a substantial part of the length of the pipe segment. In addition, the FIG. 2 embodiment also includes "wet pack" insulation 38 adjacent the frusto-conical member 10. FIGS. 4 to 6 indicate that the insulation is in the form of a knitted ceramic fibre matting 40 wrapped around the inner pipe sections 4, 4*a* and calcium silicate insulation 42 occupying the remainder of the annular space along a substantial part of the length of the pipe segment. As is the case with the FIG. 2 embodiment, the FIGS. 4 to 6 embodiment also includes "wet pack" insulation 46 adjacent the frusto-conical member 10.

FIGS. 4 to 6 illustrate the function of the bulkheads 10 of the first support means as a barrier to gas flow. The expansion joint defined by the sleeve 8 and the ends of the inner pipe sections 4, 4*a* of adjacent pipe segments 22, 22*a* do not form a gas tight seal over the whole of the pressure operating range of the transfer line. Consequently, there may be situations in which carrier gas flowing within the passageway 6 along the length of the transfer line escapes from the passageway 6 via the expansion joint and flows through the insulation that occupies the annular space between the inner and outer pipe sections 2,4. As is indicated above, such gas flow is undesirable. FIGS. 4 to 6 illustrate that the bulkheads 10 prevent the gas flow in the annular space along the transfer line beyond the bulkheads 10 and ultimately the bulkheads 10 redirect the gas flow back into the passageway 6. Thus, the bulkheads 10 minimise the adverse impact of gas escape.

Figure 7:
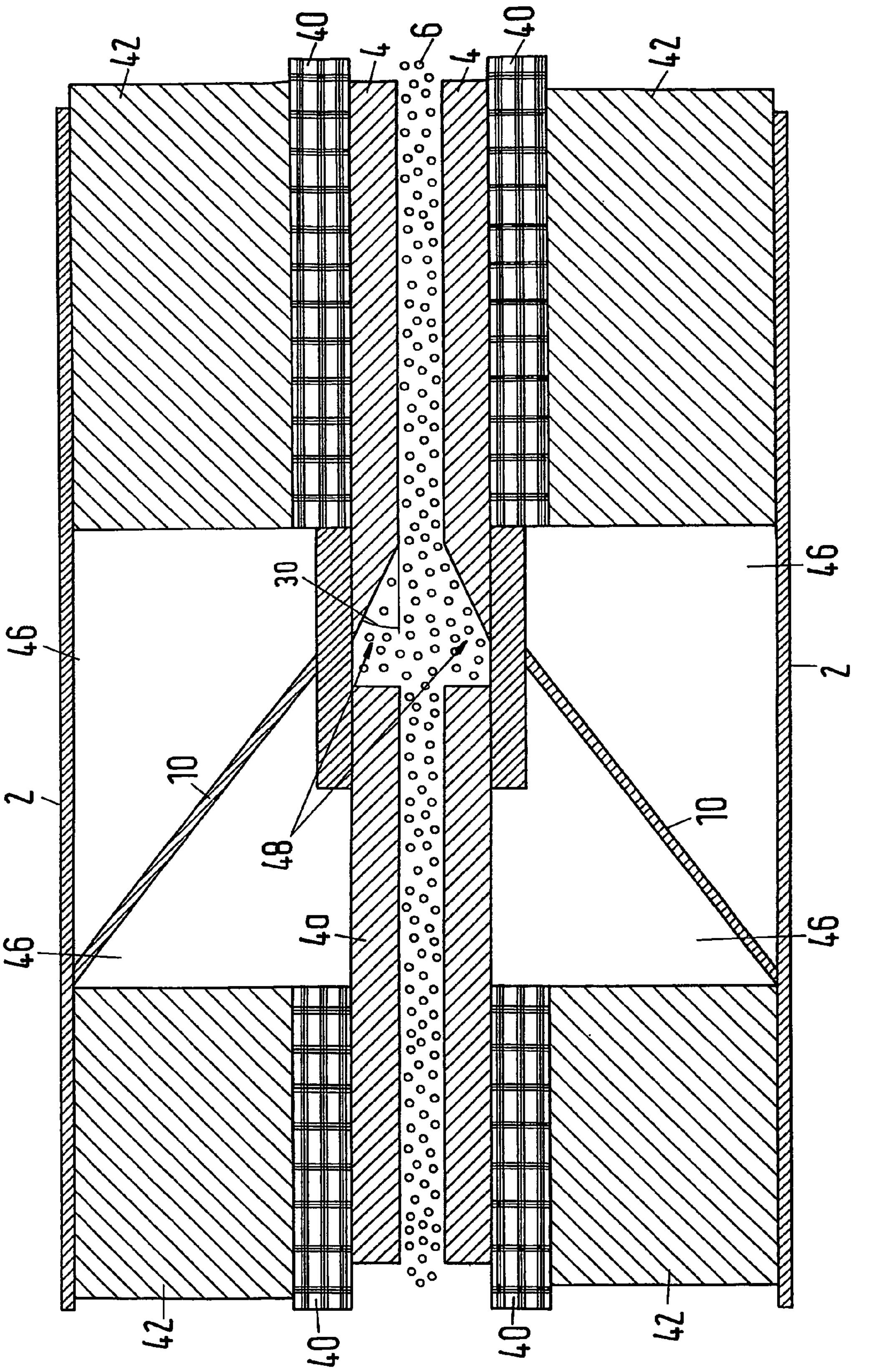
FIG. 7 is a cross section of another embodiment of a pipe segment in accordance with the invention which is a modified form of the pipe segment shown in the other Figures and includes a chamfered edge that may be included on an inner pipe.

FIG. 7 indicates a chamfered edge that may be included at least at one end of the inner pipe section 4. The chamfer 48 is preferably in the order of 30° (but may be any other suitable angle) and may be located at one or both ends of the inner pipe. Where the chamfer 48 is located on only one end of an inner pipe section 4, the section is preferably orientated so that the chamfer 48 is located on the down-stream side of the expansion joint. The chamfer 48 extends across an end face of the inner pipe from a point adjacent the outer surface of the pipe to a point adjacent the inner surface of the pipe. The point adjacent the outer surface of the pipe is located adjacent the end face and the point adjacent the inner pipe surface is located internally of the pipe. In this way the chamfer 48 forms part of the inner surface of the pipe which in use provides containment of conveying gas and fines. This location of the chamfer 48 allows any fines that may have accumulated in the expansion joint between adjacent sections of inner pipe to flow along the surface of the chamfer 48 upon any subsequent expansion of the inner pipe sections. The chamfer 48 helps to prevent an accumulation of fines in an expansion joint obstructing relative movement of the inner pipes when they undergo expansion.

Many modifications may be made to the embodiment of the present invention described above without departing from the spirit and scope of the invention.

The invention claimed is:

1. A pipe segment for transporting a hot particulate material in a carrier gas in a transfer line, which said pipe segment includes:

(a) an outer pipe, section;

(b) an inner pipe section defining a passageway for a hot particulate material and a carrier gas, the inner pipe section being positioned within the outer pipe section, and the inner pipe section being formed from or having an inner lining of an abrasion resistant material; and (c) a support means supporting the inner pipe section in relation to the outer pipe section so that the inner pipe section can expand axially relative to the outer pipe section in response to temperature changes in the material being transported in the pipe segment, the support means including a first support means located at one end of the pipe segment, the first support means including a support member that can receive an end of an inner pipe section of an adjacent pipe segment when the adjacent pipe segment is positioned in use in end to end relationship with the said pipe segment and can allow axial expansion of that inner pipe section relative to the outer pipe section of the said adjacent pipe segment in response to temperature changes in the material being transported in the said adjacent pipe segment, wherein the support member is directly connected only to the outer pipe section of the said pipe segment.

2. A pipe segment according to claim 1, wherein the support member encloses and extends axially from one end of the inner pipe section of the said pipe segment and can receive and enclose the end of the inner pipe section of the adjacent pipe segment when the said adjacent pipe segment is positioned in use in end to end relationship with the said pipe segment and can allow axial expansion of at least that inner pipe section while the ends remain enclosed within the support member.

3. The pipe segment according to claim 1, wherein the support member forms a seal with the ends of the inner pipe sections of the said pipe segment and the said adjacent pipe segment.

4. The pipe segment according to claim 1, wherein the support member includes an inwardly facing cylindrical surface for contacting the outer surfaces of the ends of the inner pipe sections of the said pipe segment and the said adjacent pipe segment.

5. The pipe segment according to claim 1, wherein the support member is in the form of a sleeve having the inwardly facing cylindrical surface.

6. The pipe segment according to claim 1, wherein the first support means also supports the inner pipe section in relation to the outer pipe section.

7. The pipe segment according to claim 1, wherein the first, support means defines a barrier to movement of gas axially along the space between the inner and outer pipe sections of the pipe segment.

8. The pipe segment according to claim 7, wherein the first support means includes a frusto-conical barrier member having a larger diameter end that is welded or otherwise, connected, to the outer pipe section of the said pipe segment and a smaller diameter end that is welded or otherwise connected to the support member.

9. The pipe segment according to claim 8, wherein the frusto-conical barrier member is arranged so that the larger diameter end is located at the end of the outer pipe section and the smaller diameter end is located inwardly of the end of the inner pipe segment.

10. The pipe segment according to claim 1, wherein the support means includes a second support means positioned at a location along the length of the pipe segment between the ends of the pipe segment and it supports the inner pipe section in relation to the outer pipe section for axial expansion relative to the outer pipe section.

11. The pipe segment according to claim 10, wherein the second support means also supports the inner pipe section in relation to the outer pipe section so that the inner pipe section can expand radially relative to the outer pipe section.

12. The pipe segment according to claim 10, wherein the second support means is welded or otherwise connected to the outer pipe section and the inner pipe section.

13. The pipe segment according to claim 10, wherein the second support means is welded or otherwise connected to the outer pipe section only.

14. The pipe segment according to claim 10, wherein the second support means is welded or otherwise connected to the inner pipe section only.

15. The pipe segment according to claim 10, wherein the second support means functions as a spring that provides a resistance to radial expansion of the inner pipe section relative to the outer pipe section.

16. The pipe segment according to claim 10, wherein the second support means is in the form of a plurality of rods, each of which is bent so as to function as a spring, that are positioned at spaced intervals around the circumference of the inner and outer pipe sections at a location along the length of the pipe segment.

17. The pipe segment according to claim 10, wherein the abrasion resistant material of the inner pipe section is a cast iron.

18. The pipe segment according to claim 17, wherein the inner pipe section is made of an wear-resistant and/or abrasion resistant material.

19. The pipe segment according to claim 10, wherein the outer pipe section is formed from a steel.

20. The pipe segment according to claim 10, wherein the pipe segment further includes thermal insulation in the space between the inner and outer pipe sections.

21. A transfer line, for transporting hot particulate material in a carrier gas, which transfer line includes a plurality of pipe segments according to claim 1.

22. The transfer line according to claim 21, wherein the plurality of pipe segments are positioned in an end to end relationship with the ends of adjacent outer pipe sections welded or otherwise connected together, and the end of one of each pair of adjacent inner pipe sections extending into and engaging the support member of the other of the pair of adjacent inner pipe sections.

23. A pipe segment for transporting a hot particulate material in a carrier gas in a transfer line, which said pipe segment includes:

(a) an outer pipe section;

(b) an inner pipe section defining a passageway for a hot particulate material and a carrier gas, the inner pipe section being positioned within the outer pipe section, and the inner pipe section being formed from or having an inner lining of an abrasion resistant material; and (c) a support means supporting the inner pipe section in relation to the outer pipe section so that the inner pipe section can expand axially relative to the outer pipe section in response to temperature changes in the material being transported in the pipe segment, the support means including a first support means located at one end of the pipe segment, the first support means including a support member that can receive an end of an inner pipe section of an adjacent pipe segment when the adjacent pipe segment is positioned in use in end to end relationship with the said pipe segment and can allow axial expansion of that inner pipe section relative to the outer pipe section of the said adjacent pipe segment in response to temperature changes in the material being transported in the said adjacent pipe segment, wherein the support member is directly connected to both the outer pipe section and the inner pipe section so that the end of the inner pipe section, but not the remainder Of the inner pipe section, is constrained from axial expansion relative to the outer pipe section at that end of the pipe segment.

24. A pipe segment for transporting a hot particulate material in a carrier gas in a transfer line, which said pipe segment includes:

(a) an outer pipe section;

(b) an inner pipe section defining a passageway for a hot particulate material and a carrier gas, the inner pipe section being positioned within the outer pipe section, and the inner pipe section being formed from or having an inner lining of an abrasion resistant material; and (c) a support means supporting the inner pipe section in relation to the outer pipe section so that the inner pipe section can expand axially relative to the outer pipe section in response to temperature changes in the material being transported in the pipe segment, the support means including a first support means located at one end of the pipe segment, the first support means including a support member that can receive an end of an inner pipe section of an adjacent pipe segment when the adjacent pipe segment is positioned in use in end to end relationship with the said pipe segment and can allow axial expansion of that inner pipe section relative to the outer pipe section of the said adjacent pipe segment in response to temperature changes in the material being transported in the said adjacent pipe segment, wherein the first support means defines a barrier to movement of gas axially along the space between the inner and outer pipe sections of the pipe segment and includes a frusto-conical barrier member having a larger diameter end that is welded or otherwise connected to the outer pipe section of the said pipe segment and a smaller diameter end that is welded or otherwise connected to the support member.

25. A pipe segment for transporting a hot particulate material in a carrier gas in a transfer line, which said pipe segment includes:

(a) an outer pipe section;

(b) an inner pipe section defining a passageway for a hot particulate material and a carrier gas, the inner pipe section being positioned within the outer pipe section, and the inner pipe section, being formed from or having an inner lining of an abrasion resistant material; and (c) a support means supporting the inner pipe section in relation to the outer pipe section so that the inner pipe section can expand axially relative to the outer pipe section in response to temperature changes in the material being transported in the pipe segment, the support means including a first support means located at one end of the pipe segment, the first support means including a support member that can receive an end of an inner pipe section of an adjacent pipe segment when the adjacent pipe segment is positioned in use in end to end relationship with the said pipe segment and can allow axial expansion of that inner pipe section relative to the outer pipe section of the said, adjacent pipe segment in response to temperature changes in the material being transported in the said adjacent pipe segment, the support means including a second support means positioned at a location along the length of the pipe segment between the ends of the pipe segment and supporting the inner pipe section in relation to the outer pipe section for axial expansion relative to the outer pipe section.

* * * * *

UNITED STATES PATENT AND TRADEMARK OFFICE

CERTIFICATE OF CORRECTION

PATENT NO. : 7,997,303 B2
APPLICATION NO. : 10/576407
DATED : August 16, 2011
INVENTOR(S) : Karsten Hoffhaus, Gunther Kazmeier and Marco Aurelio Flores-Verdugo It is certified that error appears in the above-identified patent and that said Letters Patent is hereby corrected as shown below:

ON THE TITLE PAGE:

Please replace "(73) Assignee: Outotec Oyj, Espoo (FI)" – with – "(73) Assignees: Outotec Oyj, Espoo (FI); Technological Resources Pty, Limited, Melbourne (AU)"

Signed and Sealed this
Twenty-seventh Day of March, 2012

David J. Kappos
*Director of the United States Patent and Trademark Office*